United States Patent
Rakshit et al.

(10) Patent No.: US 10,776,137 B2
(45) Date of Patent: Sep. 15, 2020

(54) DECLUTTERING A COMPUTER DEVICE DESKTOP

(71) Applicant: INTERNATIONAL BUSINESS MACHINES CORPORATION, Armonk, NY (US)

(72) Inventors: Sarbajit K. Rakshit, Kolkata (IN); James E. Bostick, Cedar Park, TX (US); Martin G. Keen, Cary, NC (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 16/197,440

(22) Filed: Nov. 21, 2018

(65) Prior Publication Data
US 2020/0159545 A1     May 21, 2020

(51) Int. Cl.
| G06F 3/048 | (2013.01) |
| G06F 9/451 | (2018.01) |
| G06F 9/48 | (2006.01) |
| G06F 3/0483 | (2013.01) |
| G06F 40/295 | (2020.01) |

(52) U.S. Cl.
CPC ............ *G06F 9/451* (2018.02); *G06F 3/0483* (2013.01); *G06F 9/4843* (2013.01); *G06F 40/295* (2020.01)

(58) Field of Classification Search
None
See application file for complete search history.

(56) References Cited

U.S. PATENT DOCUMENTS

| 7,379,867 | B2 * | 5/2008 | Chelba ................. G10L 15/197 704/236 |
| 7,743,340 | B2 * | 6/2010 | Horvitz ................ G05B 19/404 715/710 |
| 8,286,085 | B1 * | 10/2012 | Denise ................. G06Q 10/107 715/752 |
| 8,584,022 | B1 * | 11/2013 | O'Shaughnessy .. G06F 3/04817 707/821 |
| 9,361,313 | B2 * | 6/2016 | Kaasten ............... G06F 16/284 |
| 9,396,490 | B1 * | 7/2016 | Marx ................. G06Q 30/0282 |
| 10,152,533 | B2 * | 12/2018 | Lindberg .............. G06F 16/345 |
| 2003/0237093 | A1 * | 12/2003 | Marsh ................... H04N 21/84 725/46 |

(Continued)

OTHER PUBLICATIONS

DropIt: Personal Assistant to Automatically Manage Your Files; http://www.dropitproject.com/; retrieved from the Internet Aug. 3, 2018; 1 page.

*Primary Examiner* — Hua Lu
(74) *Attorney, Agent, or Firm* — Schmeiser, Olsen & Watts; Michael A. Petrocelli

(57) ABSTRACT

An approach is provided for decluttering a device desktop. Using a classification technique, a subject of a current task of a user using a device is determined. Based on a determination that the subject matches a category of first desktop object(s), the first desktop object(s) are identified as being related to the current task. Based on a determination that the subject does not match one or more categories of second desktop object(s), the second desktop object(s) are identified as being not related to the current task. Based on the second desktop object(s) being not related to the current task, the second desktop object(s) are hidden from being viewed on the desktop.

19 Claims, 8 Drawing Sheets

(56) References Cited

U.S. PATENT DOCUMENTS

| | | | |
|---|---|---|---|
| 2005/0076095 A1* | 4/2005 | Mathew | G06Q 10/06 709/217 |
| 2005/0187913 A1* | 8/2005 | Nelken | G06F 16/3344 |
| 2007/0043745 A1* | 2/2007 | Rojer | G06F 16/9562 |
| 2007/0130112 A1* | 6/2007 | Lin | G06F 16/41 |
| 2008/0005685 A1* | 1/2008 | Drews | G06F 3/0481 715/764 |
| 2008/0021701 A1* | 1/2008 | Bobick | G06N 5/022 704/9 |
| 2008/0154848 A1* | 6/2008 | Haslam | G06F 16/382 |
| 2008/0168134 A1* | 7/2008 | Goodman | G06F 16/907 709/204 |
| 2008/0168340 A1* | 7/2008 | Jang | G06F 16/168 715/206 |
| 2009/0077062 A1* | 3/2009 | Spivack | G06Q 30/0253 |
| 2009/0083338 A1* | 3/2009 | Evans | G06F 16/178 |
| 2009/0248615 A1* | 10/2009 | Drory | G06F 16/16 |
| 2012/0260209 A1* | 10/2012 | Stibel | G06Q 30/018 715/780 |
| 2013/0183951 A1* | 7/2013 | Chien | H04W 4/60 455/418 |
| 2014/0156665 A1* | 6/2014 | Kraley | G06F 16/93 707/739 |
| 2015/0081279 A1* | 3/2015 | Suleman | G06F 16/3329 704/9 |
| 2015/0281333 A1 | 10/2015 | Albert | |
| 2015/0310072 A1* | 10/2015 | Dietz | G06F 16/22 707/741 |
| 2016/0055555 A1* | 2/2016 | Mills | G06Q 30/0609 705/26.35 |
| 2016/0246816 A1* | 8/2016 | Abiri | G06F 16/148 |
| 2017/0192827 A1* | 7/2017 | Ghafourifar | G06F 9/543 |
| 2018/0011868 A1 | 1/2018 | Allen | |
| 2018/0152402 A1* | 5/2018 | Tsou | H04L 51/12 |
| 2019/0034540 A1* | 1/2019 | Perkins | G06F 16/9535 |
| 2019/0179896 A1* | 6/2019 | Anisimovich | G06N 3/088 |
| 2019/0318109 A1* | 10/2019 | Thomas | H04L 63/083 |
| 2020/0005169 A1* | 1/2020 | Whang | G06Q 30/0255 |

* cited by examiner

DECLUTTERING A COMPUTER DEVICE DESKTOP

BACKGROUND

The present invention relates to managing a computer interface, and more particularly to managing and organizing display of computer desktop objects to enhance usability.

Well-known techniques organize workspaces, configure user desktops, and filter files and folders. Known filtering of files include filtering by name, directory, size, date, properties, content, and regular expressions. A known computer architecture technique provides a proxy for a mobile user. When the mobile user enters a new environment, the user's proxy engages the appropriate resources to support the user's task. To support the proxy, a known architectural framework clarifies which new features and interfaces are required at system- and application-level. A known task manager within the architectural framework manages information related to a users' tasks, including automatically bringing up applications and files associated with a particular task in response to a user referring to that task.

A known interface mechanism quickly accesses recently used artifacts in a computer desktop environment. The interface mechanism presents a list of recently-used computer-based artifacts that can be automatically sorted or filtered in ways that are valuable to a user. The computer-based artifacts may include objects related to people, events, Uniform Resource Locators (URLs), email messages, attachments, shared objects, or shared activities.

SUMMARY

In one embodiment, the present invention provides a computer-implemented method of decluttering a desktop of a device. The method includes determining, by one or more processors and using a natural language classification technique, a subject of a current task of a user using a device. The method further includes determining, by the one or more processors and based on meta-data of objects on a desktop of the device, that the subject of the current task matches a category of first one or more objects on the desktop and does not match one or more categories of second one or more objects on the desktop. The method further includes based on the subject of the current task matching the category of the first one or more objects, identifying, by the one or more processors, the first one or more objects as being related to the current task. The method further includes based on the subject of the current task not matching the one or more categories of the second one or more objects, identifying, by the one or more processors, the second one or more objects as being not related to the current task. The method further includes based on the second one or more objects being not related to the current task, hiding, by the one or more processors, the second one or more objects from being viewed on the desktop.

The aforementioned embodiment provides an improvement in the efficiency of using a device by decluttering the device desktop by displaying only objects that are determined to be relevant to a task at hand, which is also referred to herein as a current task.

In one optional aspect of the aforementioned embodiment, the method further includes receiving, by the one or more processors, a selection of a file or a folder included in the objects on the desktop. The method further includes determining, by the one or more processors, that the selected file or folder is associated with an initial category by meta-data of the selected file or folder. The method further includes receiving, by the one or more processors, a manual override by a user of the meta-data associating the selected file or folder with the initial category so that the meta-data is associated with a new category. The method further includes based on the receipt of the manual override, adjusting, by the one or more processors, a preconfigured rule that had specified an association between the meta-data and the initial category so that the preconfigured rule specifies a new association between the meta-data and the new category. The method further includes receiving, by the one or more processors, a selection of another file or another folder included in the objects on the desktop. The method further includes determining, by the one or more processors, that the adjusted preconfigured rule indicates that keywords or one or more people specified in the selected other file or other folder indicate that the selected other file or other folder is related to the new category. The aforementioned aspect advantageously allows a desktop decluttering system to self-learn by applying the adjusted preconfigured rule to a subsequent user selection of a desktop object, where the self-learning speeds up desktop decluttering and enhances the user's efficiency in using the desktop over time.

In another embodiment, the present invention provides a computer program product for decluttering a desktop of a device. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes using a natural language classification technique, the computer system determining a subject of a current task of a user using a device. The method further includes based on meta-data of objects on a desktop of the device, the computer system determining that the subject of the current task matches a category of first one or more objects on the desktop and does not match one or more categories of second one or more objects on the desktop. The method further includes based on the subject of the current task matching the category of the first one or more objects, the computer system identifying the first one or more objects as being related to the current task. The method further includes based on the subject of the current task not matching the one or more categories of the second one or more objects, the computer system identifying the second one or more objects as being not related to the current task. The method further includes based on the second one or more objects being not related to the current task, the computer system hiding the second one or more objects from being viewed on the desktop.

Advantages of the aforementioned computer program product embodiment include the advantages discussed above relative to the embodiment that provides the method of decluttering a desktop of a device. Optional aspects of the aforementioned computer program product embodiment include the aspects discussed above relative to the embodiment that provides the method of decluttering a desktop of a device. Advantages of the optional aspects of the computer program product embodiment include the advantages discussed above relative to the embodiment that provides the method of decluttering a desktop of a device.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of decluttering a desktop of a device. The method includes using a natural language classification technique, the computer system determining a subject of a current task of a user using a device. The method further includes based on meta-data of objects on a desktop of the device, the computer system determining that the subject of the current task matches a category of first one or more objects on the desktop and does not match one or more categories of second one or more objects on the desktop. The method further includes based on the subject of the current task matching the category of the first one or more objects, the computer system identifying the first one or more objects as being related to the current task. The method further includes based on the subject of the current task not matching the one or more categories of the second one or more objects, the computer system identifying the second one or more objects as being not related to the current task. The method further includes based on the second one or more objects being not related to the current task, the computer system hiding the second one or more objects from being viewed on the desktop.

Advantages of the aforementioned computer system embodiment include the advantages discussed above relative to the embodiment that provides the method of decluttering a desktop of a device. Optional aspects of the aforementioned computer system embodiment include the aspects discussed above relative to the embodiment that provides the method of decluttering a desktop of a device. Advantages of the optional aspects of the computer system embodiment include the advantages discussed above relative to the embodiment that provides the method of decluttering a desktop of a device.

DETAILED DESCRIPTION

Overview

Figure 1:
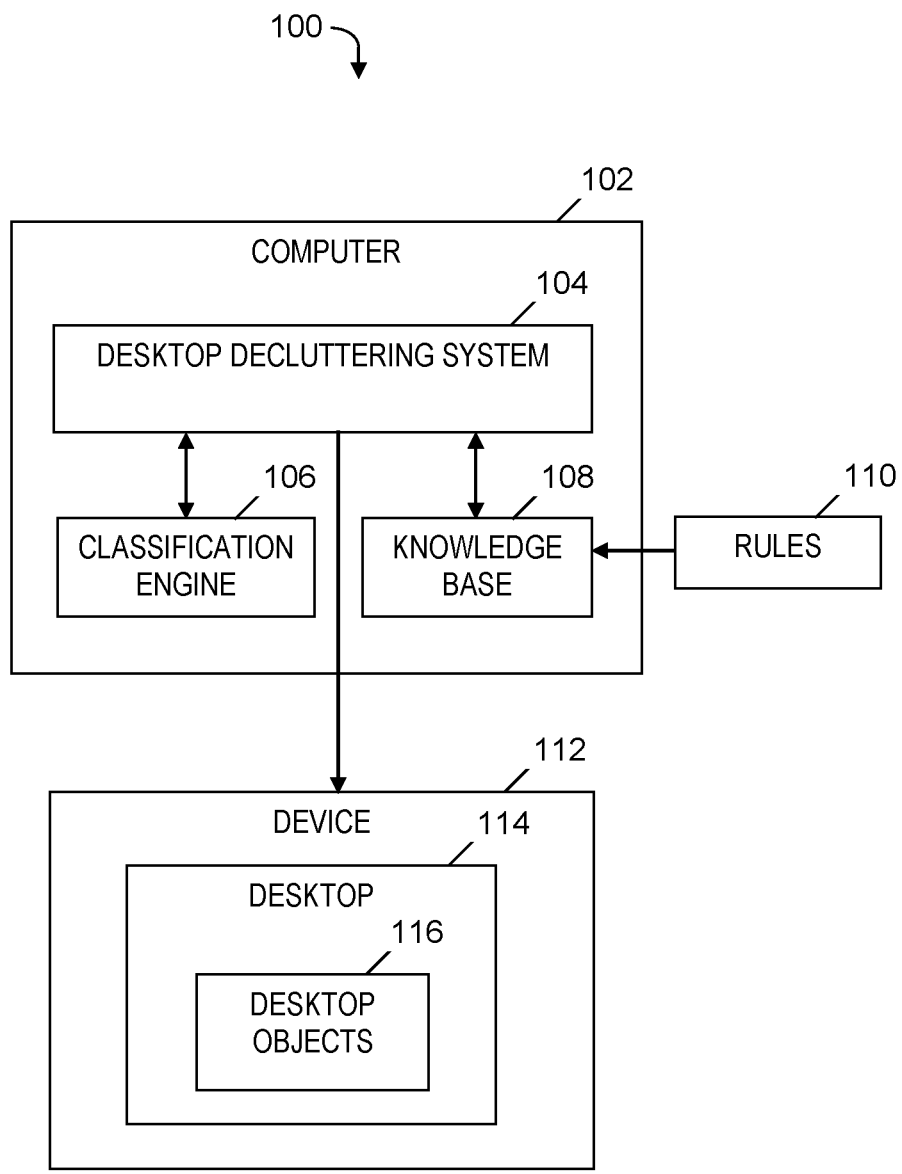
FIG. 1 is a block diagram of a system for decluttering a desktop of a device, in accordance with embodiments of the present invention.

Challenges related to multi-tasking include a user having difficulty finding folders and files on a device desktop that are relevant to a user's current task. For example, when working on a project A for client X, a user may need to reference a significant number of materials that the user has previously collected for educational purposes or because the user is involved in designing a product according to business specifications. The user may have many files related to client X, but only a small subset of those files pertains to project A. The user may also be involved in projects B, C, D, and E which are associated with client X. The user may also be performing tasks for other clients or be studying for a specific subject, which involve other sets of files unrelated to project A. The user may have difficulty looking for a reference document needed for project A because there are too many other documents that are recently used by the user but that are unrelated to project A. These usability difficulties in finding files and folders on a desktop that are relevant to a current task negatively impact the user's efficiency in completing the current task. Furthermore, conventional desktop decluttering techniques have no understanding of what task a user is currently working on and therefore conventional decluttering lacks precision in identifying exactly the files and folders that the user may need relative to the current task of the user, and instead may identify more or fewer files and folders than what the user needs for the current task.

Embodiments of the present invention address the aforementioned challenges by finding and prominently displaying folders and files that are relevant to a first task that the user is currently doing, and subsequently finding and prominently displaying other folders and files that are relevant to a second task, in response to the current task of the user being updated from the first task to the second task. In one embodiment, a desktop decluttering system cleans up (i.e., declutters) a device desktop by hiding (or otherwise visually de-emphasizing) desktop objects that are not related to the user's task at hand. In one embodiment, desktop objects include icons displayed on a desktop of a device, where the icons represent files, folders, and/or shortcuts. In one embodiment, the desktop decluttering system employs cognitive computing to determine the task that the user is currently performing, categorize each file and folder, and determine the particular files and folders that are related to the task that the user is currently performing based on the categorization of the files and folders. In one embodiment, in response to the user switching to a new task, the desktop decluttering system modifies the desktop and/or any folder the user opens to display only files and folders related to the new task. Embodiments of the present invention employ classification techniques to pre-run classifications against files and folders and compare those classifications to real-time classifications that define the current task of the user.

Embodiments of the present invention employ self-learning techniques so that rules that associate keywords and people with categories self-adjust systematically based on actions of the user. In response to a user manually overriding meta-data of a file or folder that specifies one category so that the file or folder becomes associated with another category, embodiments of the present invention self-learn and become more precise over time by adjusting rules, so that other desktop objects that have content similar to the file or folder will be subsequently associated with the other category based on the adjusted rules.

System for Decluttering a Device Desktop

FIG. 1 is a block diagram of a system 100 for decluttering a device desktop, in accordance with embodiments of the present invention. System 100 includes a computer 102 which executes a software-based desktop decluttering system 104 and a software-based classification engine. Desktop decluttering system 104 has access to a knowledge base 108. Knowledge base 108 receives pre-configured rules 110 that associate keywords or people with categories or subjects.

Desktop decluttering system 104 is operatively coupled to a device 112 (i.e., a computer device, such as a desktop computer or a laptop computer), which includes a desktop 114, which includes desktop objects 116. Desktop 114 is an element of a graphical user interface of device 112 and includes a visual representation of a real desktop, which allows a user of device 112 to interact with and perform operations on device 112. Desktop 114 includes desktop objects 116 (e.g., files and folders) represented as icons, and further includes menus and icons for launching applications and managing device 112. A user of device 112 can manipulate the icons representing the desktop objects 116 by using a computer mouse or other pointing device to click and drag the icons on desktop 114.

Desktop decluttering system 104 determines which files and folders and other desktop objects 116 are relevant to a task (i.e., current task) currently being performed by a user of device 112. In a configuration phase that occurs prior to the decluttering of desktop 114, desktop decluttering system 104 determines whether a given desktop objects included in desktop objects 116 (i) has previously set meta-data that indicates a category of the desktop object, (ii) has keywords or identifications of people that indicate a category according to a pre-configured rule included in rules 110, or (iii) has contents that need to be cognitively assessed by classification engine 106 running natural language classification techniques against the files, folders, and other desktop objects 116 to determine a category of the desktop object. Classification engine 106 also determines the subject matter of the current task by running classification techniques in real time against desktop objects that are being accessed by a user as the user is performing the current task.

Desktop decluttering system 104 determines first and second mutually exclusive sets of desktop objects included in desktop objects 116, where the first set of desktop objects are relevant to the current task and the second set of desktop objects are not relevant to the current task. Desktop decluttering system 104 determines that a given desktop object is relevant to the current task by determining that the subject matter of the current task matches the category of the given desktop object. Desktop decluttering system 104 determines that a given desktop object is not relevant to the current task by determining that the subject matter of the current task does not match the category of the given desktop object.

Desktop decluttering system 104 provides a self-learning system by adjusting rules 110 stored in knowledge base 108 based on actions of the user of device 112, including the user's manual overrides of meta-data of desktop objects, where the meta-data specifies respective categories of the desktop objects.

The functionality of the components shown in FIG. 1 is described in more detail in the discussion of FIG. 2, FIG. 3, FIG. 4, FIG. 5, and FIG. 6 presented below.

Process for Decluttering a Device Desktop

Figure 2:
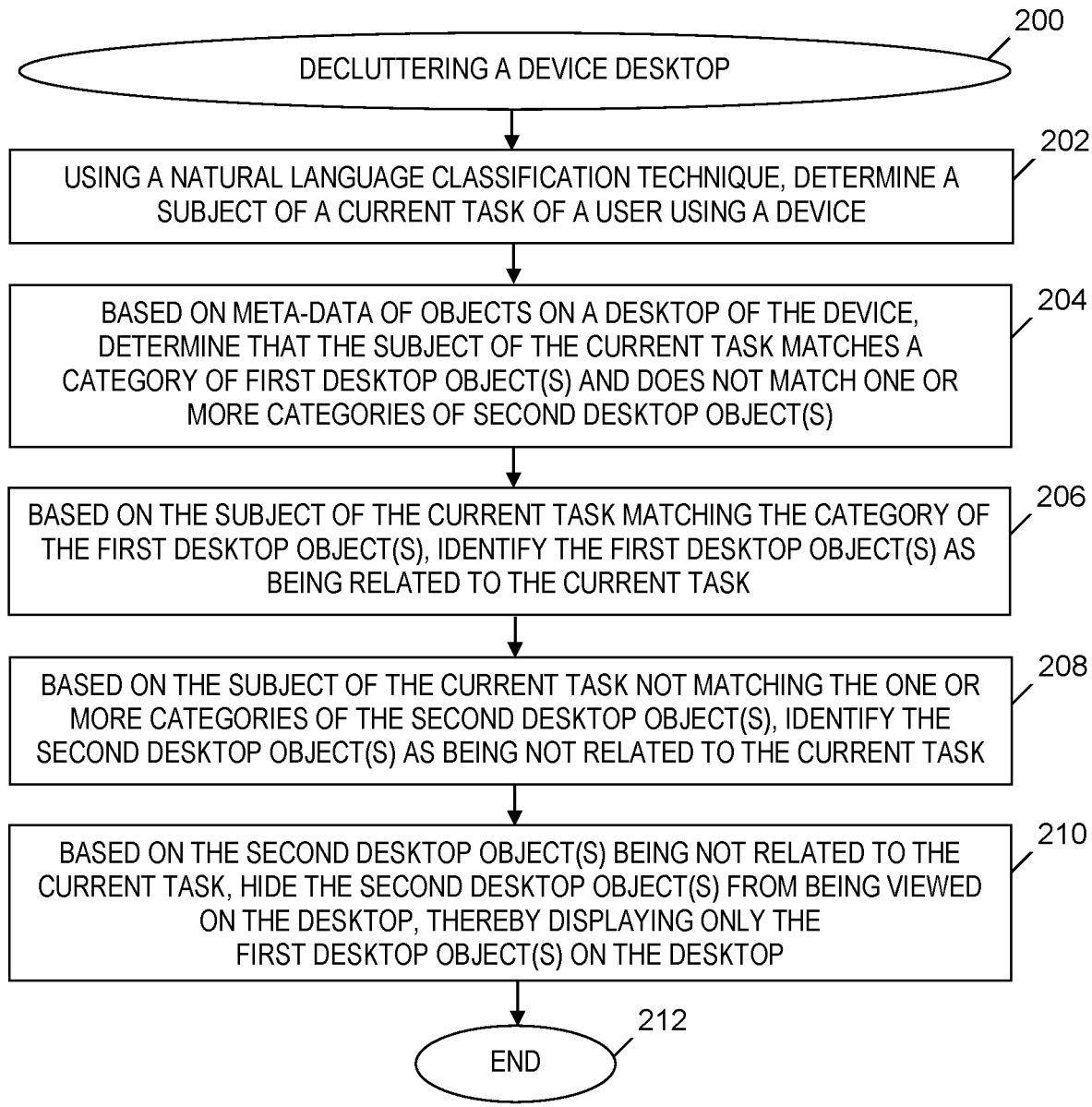
FIG. 2 is a flowchart of a process of decluttering a desktop of a device, where the process is implemented in the system of FIG. 1, in accordance with embodiments of the present invention.

FIG. 2 is a flowchart of a process of decluttering a desktop of a device, where the process is implemented in the system of FIG. 1, in accordance with embodiments of the present invention. The process of FIG. 2 starts at step 200. Prior to step 202 and prior to a user of device 112 (see FIG. 1) starting to perform a task, the device 112 (see FIG. 1) displays desktop objects 116 (see FIG. 1) on desktop 114 (see FIG. 1).

In step 202, desktop decluttering system 104 (see FIG. 1) (i) directs classification engine 106 (see FIG. 1) to run natural language classification technique(s) against content of one or more of desktop objects 116 (see FIG. 1) that the user of device 112 (see FIG. 1) is accessing to perform a current task and (ii) uses the result of the natural language classification technique(s) to determine a subject of a current task being performed by the user of device 112 (see FIG. 1). In one embodiment, prior to step 202, desktop decluttering system 104 (see FIG. 1) detects that the user of device 112 (see FIG. 1) has started a current task (e.g., started working on a project) and step 202 is performed in response to desktop decluttering system 104 (see FIG. 1) detecting that the user has started the current task. In one embodiment, the user of device 112 (see FIG. 1) starts the current task by opening one of the desktop objects 116 (see FIG. 1) or by opening an e-mail that was received or sent by the user. In one embodiment, opening a desktop object includes opening a folder or a file on desktop 114 (see FIG. 1).

In step 204, based on previously set meta-data of desktop objects 116 (see FIG. 1), where the meta-data specifies categories into which desktop objects 116 (see FIG. 1) are classified, desktop decluttering system 104 (see FIG. 1) determines that the subject of the current task (i) matches a category of first one or more desktop objects (i.e., a first set of desktop object(s)) included in desktop objects 116 (see FIG. 1) and (ii) does not match any category of second one or more desktop objects (i.e., a second set of desktop object(s)) included in desktop objects 116 (see FIG. 1). In one embodiment, the first set of desktop object(s) and the second set of desktop object(s) are mutually exclusive. In one embodiment, desktop objects 116 (see FIG. 1) consist of only the first and second sets of desktop object(s).

In step 206, based on the subject of the current task matching the category of the desktop object(s) in the first set of desktop object(s), desktop decluttering system 104 (see FIG. 1) identifies the first set of desktop object(s) as being related to the current task.

In step 208, based on the subject of the current task not matching any category of the second set of desktop object(s), desktop decluttering system 104 (see FIG. 1) identifies the second set of desktop object(s) as being not related to the current task.

In step 210, based on the second set of desktop object(s) being not related to the current task, desktop decluttering system 104 (see FIG. 1) hides the second set of desktop object(s) so that the second set of desktop object(s) cannot be viewed on desktop 114 (see FIG. 1) by a user of device 112 (see FIG. 1). By hiding the second set of desktop object(s), desktop decluttering system 104 (see FIG. 1) is displaying the first set of desktop object(s) on desktop 114 (see FIG. 1). In one embodiment, desktop decluttering system 104 (see FIG. 1) visually emphasizes the first set of desktop object(s) by color coding files and folders in the first set of desktop object(s) to relate the files and folders to categories or by emboldening graphical elements and/or text associated with the first set of desktop object(s). In one embodiment, desktop decluttering system 104 (see FIG. 1) visually de-emphasizes the second set of desktop object(s) by lightening or otherwise displaying the second set of desktop object(s) with graphical elements that are less visually prominent than graphical elements of the first set of desktop object(s).

Following step 210, the process of FIG. 2 ends at step 212.

In one embodiment, subsequent to step 210, desktop decluttering system 104 (see FIG. 1) (i) receives a selection by the user to turn off the hiding of the second set of desktop object(s), and (ii) in response to receiving the selection, re-displaying the second set of desktop object(s) together with the first set of desktop object(s) on desktop 114 (see FIG. 1).

In one embodiment, desktop decluttering system 104 (see FIG. 1) is in communication with a calendar system that manages calendar entries for the user. After step 206, (1) desktop decluttering system 104 (see FIG. 1) determines that the first set of desktop object(s) are associated with a calendar entry in the calendar system based on an association between the category of the first set of desktop object(s) and the content or date of the calendar entry, where the association is stored in knowledge base 108 (see FIG. 1) and (2) the calendar system displays the first set of desktop object(s) in response to the user viewing the calendar entry in the calendar system. Furthermore, in step 202, desktop decluttering system 104 (see FIG. 1) may determine the subject of a current task by determining the subject of a calendar entry that the user is accessing.

Figure 3:
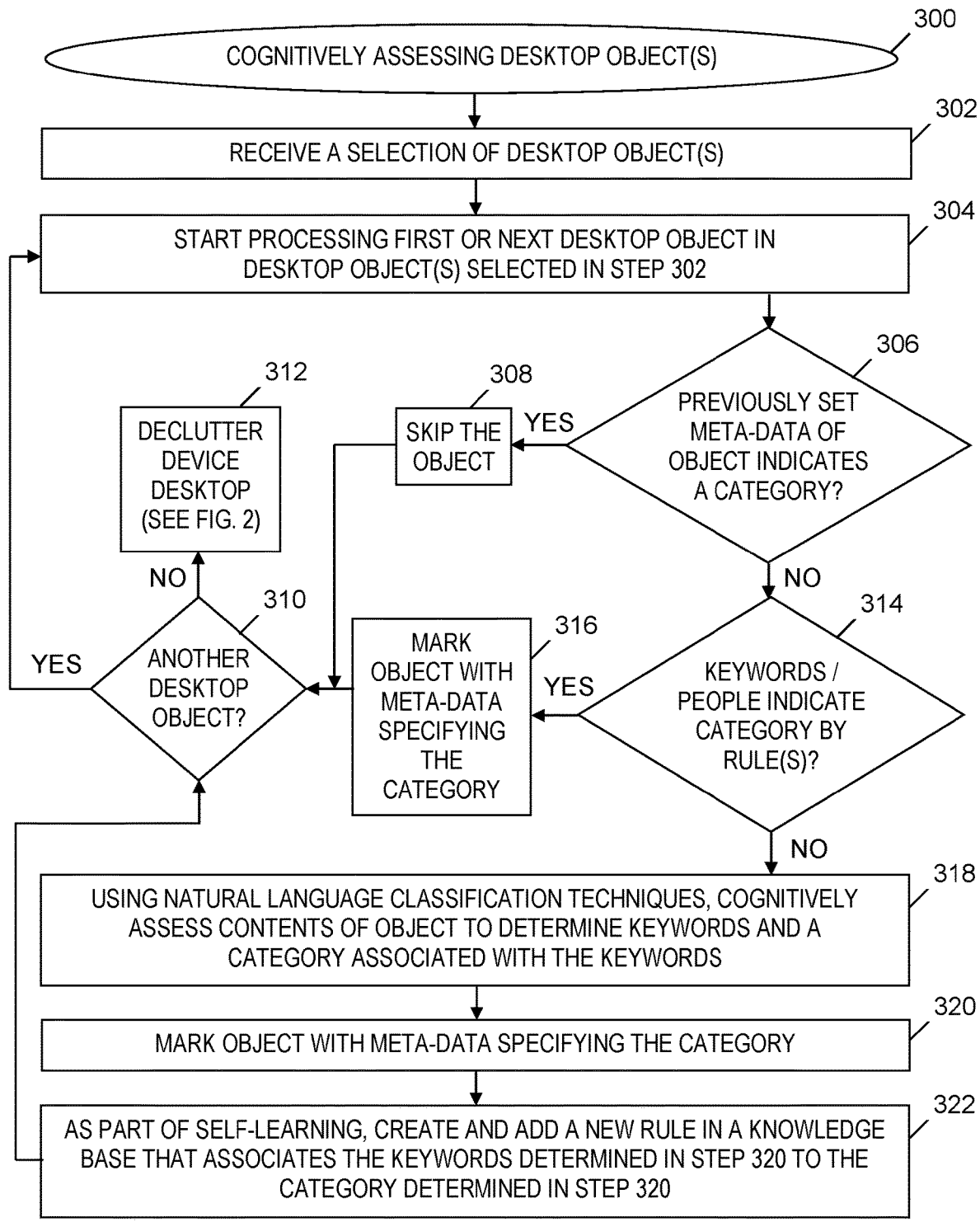
FIG. 3 is flowchart of a process of cognitively assessing desktop objects, where the process is performed prior to the process of FIG. 2 and is implemented in the system of FIG. 1, in accordance with embodiments of the present invention.

FIG. 3 is flowchart of a process of cognitively assessing desktop objects, where the process is performed prior to the process of FIG. 2 and is implemented in the system of FIG. 1, in accordance with embodiments of the present invention. The process of FIG. 3 starts at step 300. In step 302, desktop decluttering system 104 (see FIG. 1) receives a user selection of desktop object(s) included in desktop objects 116 (see FIG. 1). Alternatively, desktop decluttering system 104 (see FIG. 1) selects all the desktop objects included in desktop objects 116 (see FIG. 1) by default or by user selection.

In step 304, desktop decluttering system 104 (see FIG. 1) starts processing a first desktop object included in the desktop object(s) selected in step 302 if step 304 is being performed for the first time in the process of FIG. 3. If step 304 is being performed again in the process of FIG. 3, then desktop decluttering system 104 (see FIG. 1) starts processing a next desktop object included in the desktop object(s) selected in step 302, where the next desktop object has not yet been processed by the steps in FIG. 3. Hereinafter, in the discussion of FIG. 3, the first desktop object and the next desktop object are simply referred to as "the desktop object."

In step 306, desktop decluttering system 104 (see FIG. 1) determines whether previously set meta-data of the desktop object indicates a category into which the desktop object is classified. If desktop decluttering system 104 (see FIG. 1) determines in step 306 that the previously set meta-data of the desktop object indicates a category, then the Yes branch of step 306 is followed and step 308 is performed.

In step 308, desktop decluttering system 104 (see FIG. 1) skips further processing of the desktop object and the process of FIG. 3 continues with step 310, unless the user manually overrides the category indicated by the meta-data. Manual overrides are discussed below and relative to FIG. 5.

In step 310, desktop decluttering system 104 (see FIG. 1) determines whether there is another desktop object included in the desktop object(s) whose selection was received in step 302 that has not yet been processed by the process of FIG. 3. If desktop decluttering system 104 (see FIG. 1) determines in step 310 that there is another desktop object that has not yet been processed, then the Yes branch of step 310 is followed and the process of FIG. 3 loops back to step 304.

If desktop decluttering system 104 (see FIG. 1) determines in step 310 that there is no remaining desktop object in the desktop object(s) selected in step 302 that has not yet been processed by the process of FIG. 3, then the No branch of step 310 is followed and step 312 is performed. In step 312, desktop decluttering system 104 (see FIG. 1) declutters desktop 114 (see FIG. 1) of device 112 (see FIG. 1) by using the process in FIG. 2.

Returning to step 306, if desktop decluttering system 104 (see FIG. 1) determines that the previously set meta-data of the desktop object does not indicate a category or that there is no previously set meta-data for the desktop object, then the No branch of step 306 is followed and step 314 is performed.

In step 314, desktop decluttering system 104 (see FIG. 1) determines whether keywords in the content of the desktop object or one or more people associated with the desktop object indicate a category based on an application of rule(s) in knowledge base 108 (see FIG. 1). In one embodiment, the application of the rule(s) includes a probabilistic analysis that determines a measure of likelihood that the keywords or the one or more people are associated with a particular category. If desktop decluttering system 104 (see FIG. 1) determines in step 314 that the keywords or the one or more people indicate a category for the desktop object, then the Yes branch of step 314 is followed and step 316 is performed. For example, if the user opens a file whose content mentions Project XYZ as a keyword, then in step 314, desktop decluttering system 104 (see FIG. 1) determines that "Project XYZ" indicates a category that includes Project XYZ. As another example, if the user opens an e-mail that the user received from Person A, then desktop decluttering system 104 (see FIG. 1) determines that Person A indicates the category that includes Project XYZ because Person A is associated with Project XYZ according to an association between Person A and Project XYZ stored in knowledge base 108 (see FIG. 1).

In step 316, desktop decluttering system 104 (see FIG. 1) marks the desktop object with meta-data indicating the category whose indication by the keywords or the one or more people was determined in step 314. Following step 316, step 310 is performed as described above.

If desktop decluttering system 104 (see FIG. 1) determines in step 314 that the keywords or the one or more people do not indicate a category for the desktop object according to rule(s) in knowledge base 108 (see FIG. 1), then the No branch of step 314 is followed and step 318 is performed.

In step 318, desktop decluttering system 104 (see FIG. 1) (i) directs classification engine 106 (see FIG. 1) to run natural language classification technique(s) to cognitively assess contents of the desktop object and (ii) uses the result of the natural language classification technique(s) to determine a prevalence of keywords in the contents and to determine a category associated with the keywords.

In step 320, desktop decluttering system 104 (see FIG. 1) marks the desktop object with meta-data that specifies the category determined in step 318.

In step 322, desktop decluttering system 104 (see FIG. 1) provides self-learning by creating and adding a new rule in knowledge base 108 (see FIG. 1) that associates the keywords determined in step 318 to the category determined in step 318. Following step 322, step 310 is performed as described above.

Alternatively, the references to a category in the process of FIG. 3 can be replaced with a category and a sub-category of the category. For example, keywords in a document opened by the user include a matter identification number P12349876, which identifies a patent application, and in step 314, desktop decluttering system 104 (see FIG. 1) determines that P12349876 indicates the "Patent" category and the "P12349876" sub-category.

In one embodiment, subsequent to step 322, desktop decluttering system 104 (see FIG. 1) receives a selection of another desktop object, determines that content of the selected other desktop object includes the keywords determined in step 318, and based on the content of the selected other desktop object including the keywords, determines that the selected other desktop object is related to the category determined in step 318, without requiring a cognitive assessment of the content of the selected other desktop object.

In one embodiment, the cognitive assessment in step 318 includes desktop decluttering system 104 (see FIG. 1) (1) determining that a word included in the content of the selected desktop object is not one of a plurality of keywords specified by preconfigured rules, (2) using a synonym dictionary and based on the word not being one of the plurality of keywords, looking up the word included in the content of the selected desktop object and finding a synonym of the word, (3) determining that the synonym of the word is one of the plurality of keywords specified by the reconfigured rules, and (4) based on the synonym being one of the plurality of keywords, determining that the word is associated with the category determined in step 318.

In one embodiment, after cognitively assessing the contents of a selected desktop object in step 318, marking the desktop object with meta-data specifying an initial category in step 320 and creating and adding the new rule in step 322, desktop decluttering system 104 (see FIG. 1) receives a selection of the same desktop object, determines the that selected desktop object is associated with the initial category, and receives a user's manual override of the meta-data associating the selected desktop object with the initial category, resulting in the meta-data being associated with a new category which is different from the initial category. Based on the receipt of the manual override, desktop decluttering system 104 (see FIG. 1) adjusts the rule that had specified an association between the meta-data and the initial category, where the result of the adjustment is the rule specifying a new association between the meta-data and the new category. Subsequently, desktop decluttering system 104 (see FIG. 1) receives a selection of another desktop object and determines that the adjusted rule indicates that keywords or one or more people specified in the selected other desktop object indicates that the selected other desktop object is related to the new category.

Alternatively, the adjusted rule places a weighted priority on an amount of similarity between the subject or title of the initially selected desktop object and the subject or title of the selected other desktop object. If the aforementioned subjects or titles match, then desktop decluttering system 104 (see FIG. 1) determines that the keywords or the one or more people specified in the selected other desktop object indicate that the other desktop object is included in the new category; otherwise, the desktop decluttering system 104 (see FIG. 1) determines that the other desktop object is included in the initial category.

Figure 4:
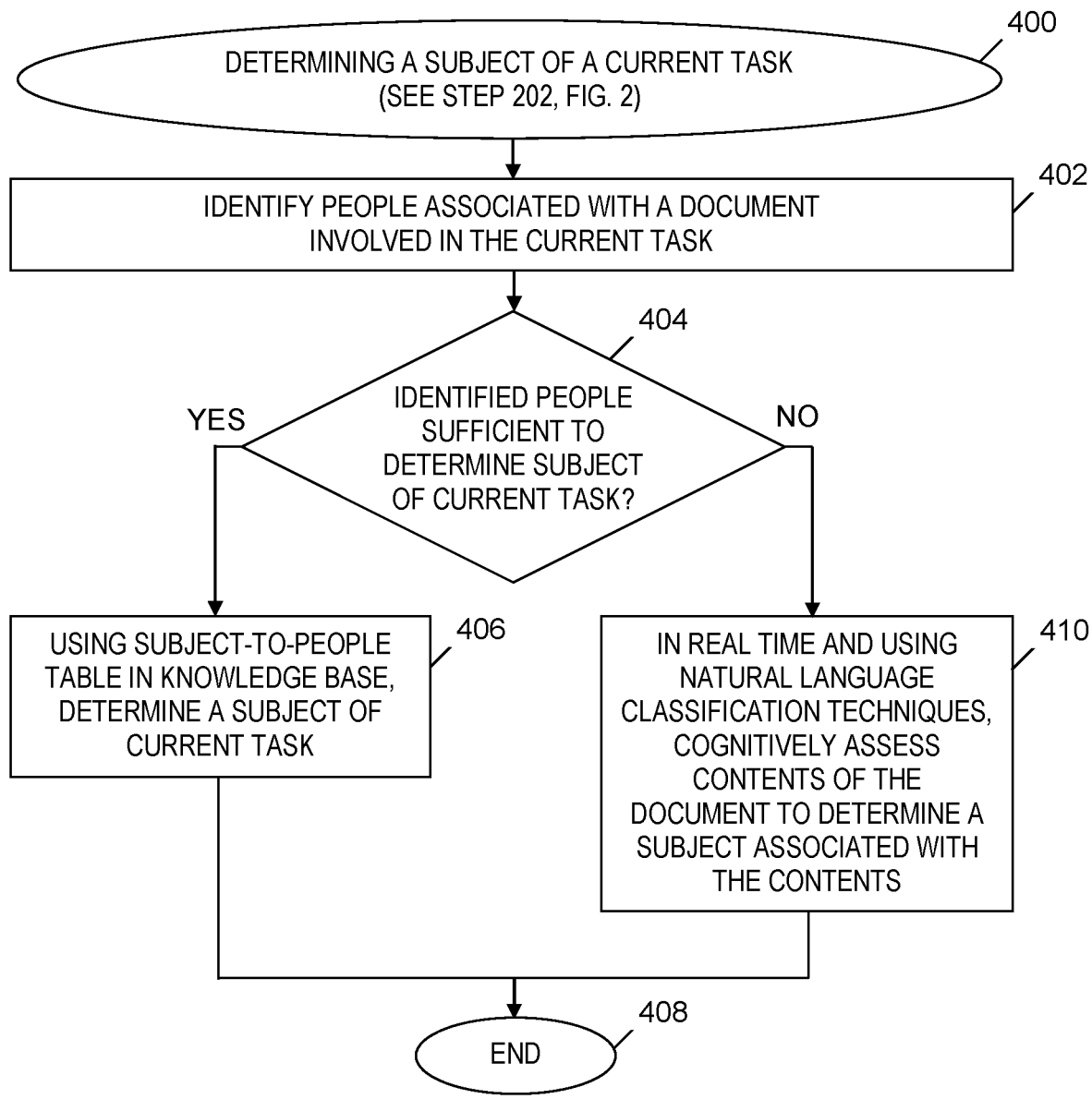
FIG. 4 is flowchart of a process of determining a subject of a current task, which is included in the process of FIG. 2 and is implemented in the system of FIG. 1, in accordance with embodiments of the present invention.

FIG. 4 is flowchart of a process of determining a subject of a current task, which is included in the process of FIG. 2 and is implemented in the system of FIG. 1, in accordance with embodiments of the present invention. The process of FIG. 4 starts at step 400. In one embodiment, the process of FIG. 4 is included in step 202 in FIG. 2. In step 402, desktop decluttering system 104 (see FIG. 1) identifies one or more people associated with a document that is being accessed by a user who is performing a current task by using device 112 (see FIG. 1), where the document is one of the desktop objects 116 (see FIG. 1). In one embodiment, the document is an e-mail received or sent by the user and the one or more people are included on the To: line, the From: line, and/or the cc: line of the e-mail.

In step 404, desktop decluttering system 104 (see FIG. 1) determines whether the identified one or more people are sufficient to determine the subject of the current task. If desktop decluttering system 104 (see FIG. 1) determines in step 404 that the identified one or more people are sufficient to determine the subject of the current task, then the Yes branch of step 404 is followed and step 406 is performed. The identified one or more people are sufficient to determine the subject in step 404 if knowledge base 108 (see FIG. 1) associates the one or more people with a single subject. If knowledge base 108 (see FIG. 1) associates each of the one or more people with multiple subjects, then the identified one or more people are not sufficient to determine the subject in step 404.

In step 406, desktop decluttering system 104 (see FIG. 1) uses a subject-to-people table or other rule(s) in knowledge base 108 (see FIG. 1) to determine a subject of the current task. Following step 406, the process of FIG. 4 ends at step 408.

Returning to step 404, if desktop decluttering system 104 (see FIG. 1) determines that the identified one or more people are not sufficient to determine the subject of the current task, then the No branch of step 404 is followed and step 410 is performed.

In step 410, desktop decluttering system 104 (see FIG. 1) (i) in real time directs classification engine 106 (see FIG. 1) to run natural language classification techniques to cognitively assess contents of the document the user is accessing and (ii) uses the result of the classification techniques to determine a subject associated with the contents. Following step 410, the process of FIG. 4 ends at step 408.

Figure 5:
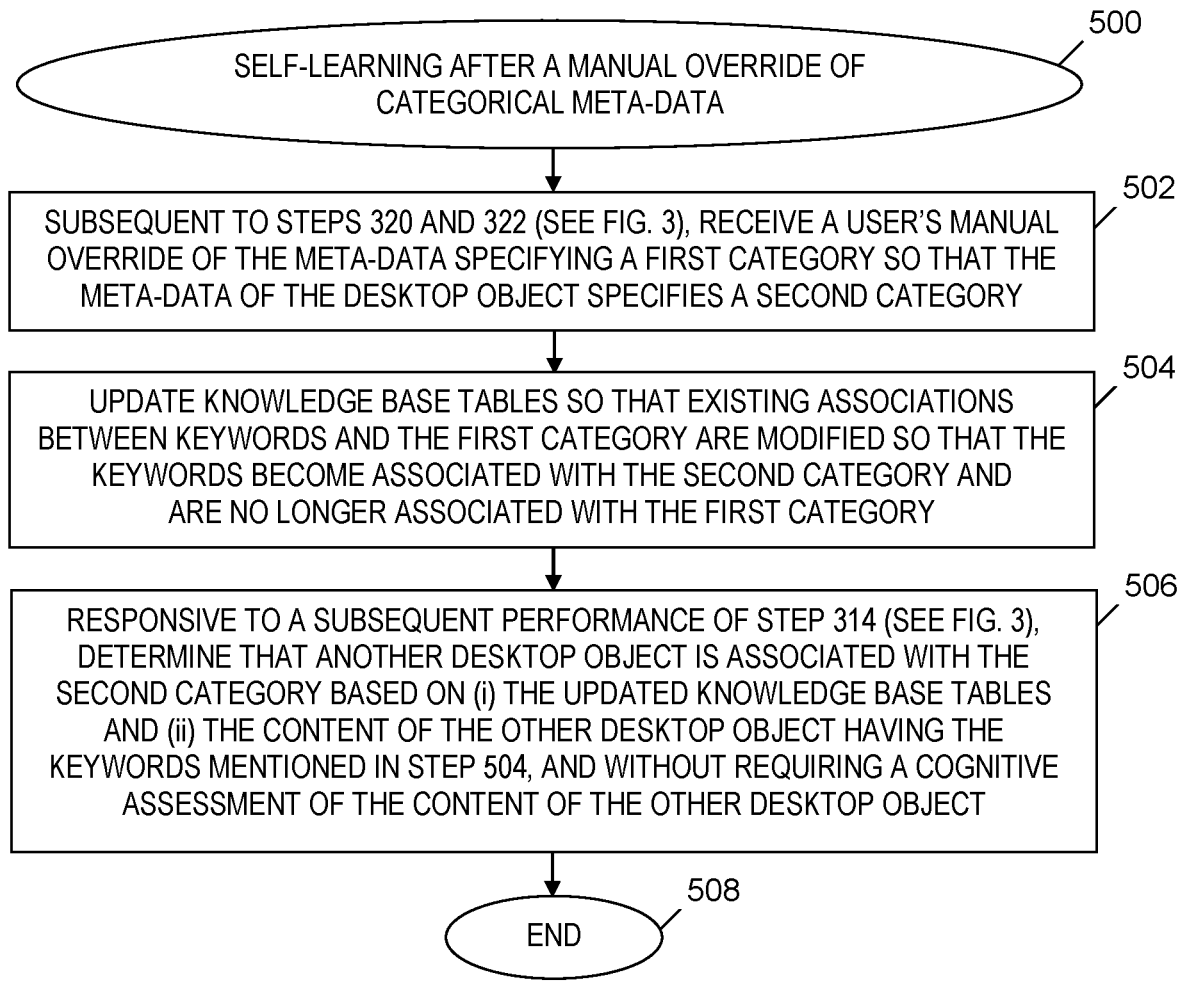
FIG. 5 is flowchart of a process of self-learning after a manual override of categorical meta-data, which is included in the process of FIG. 2 and is implemented in the system of FIG. 1, in accordance with embodiments of the present invention.

FIG. 5 is flowchart of a process of self-learning after a manual override of categorical meta-data, which is included in the process of FIG. 2 and is implemented in the system of FIG. 1, in accordance with embodiments of the present invention. The process of FIG. 5 starts at step 500. In step 502, subsequent to steps 320 and 322 in FIG. 3, desktop decluttering system 104 (see FIG. 1) receives a user's manual override of meta-data of a desktop object that initially specifies a first category of a desktop object so that the meta-data of the desktop object specifies a second category, which is different from the first category.

In step 504, desktop decluttering system 104 (see FIG. 1) updates table(s) in knowledge base 108 (see FIG. 1) so that existing associations between keywords and the first category are modified so that the keywords become associated with the second category and are no longer associated with the first category.

In step 506, responsive to a subsequent performance of step 314 (see FIG. 3), desktop decluttering system 104 (see FIG. 1) determines that another desktop object is associated with the second category based on (i) table(s) of knowledge base 108 (see FIG. 1) updated in step 504 and (ii) the content of the other desktop object having the keywords mentioned in step 504, and without requiring a cognitive assessment of the content of the other desktop object.

Following step 506, the process of FIG. 5 ends at step 508.

Examples

Figure 6A:
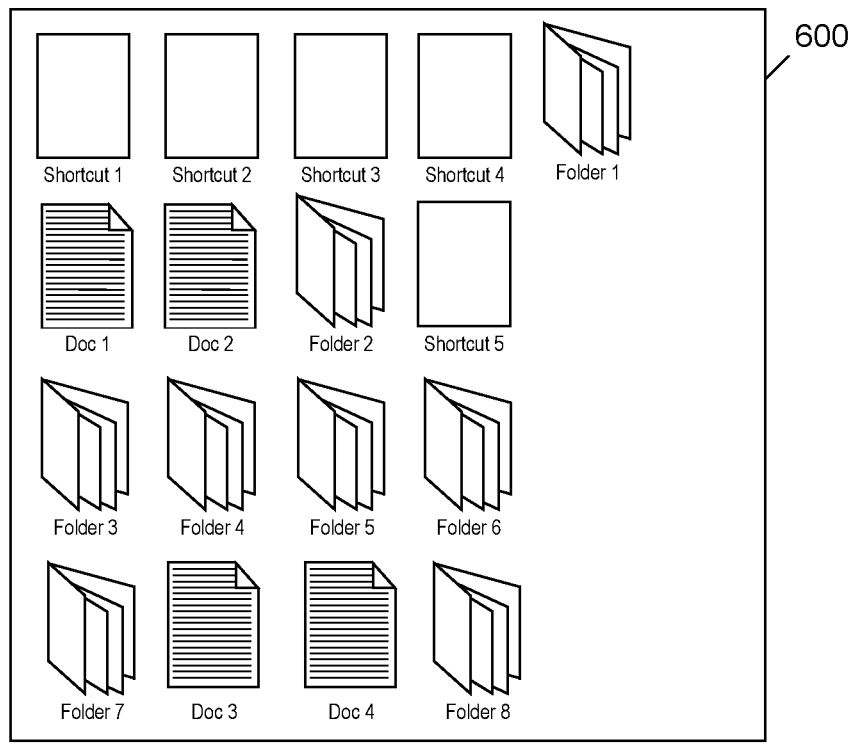
FIGS. 6A-6C depict an example showing a series of views of a desktop in the system of FIG. 1 including a first view of a full set of desktop objects, a second view of a first subset of desktop objects related to a first current task of a user, which are displayed in the process of FIG. 2 after other desktop objects that are not related to the first current task are hidden from view, and a third view of a second subset of desktop objects related to a second current task of the user, which are displayed in the process of FIG. 2 after other desktop objects that are not related to the second current task are hidden from view, in accordance with embodiments of the present invention.

A sample view 600 in FIG. 6A is a view of desktop 114 (see FIG. 1) which includes a full set of desktop objects (i.e., desktop objects 116 (see FIG. 1)), which are displayed on desktop 114 (see FIG. 1) prior to the start of the process of FIG. 2. The desktop objects in view 600 that are labeled "Doc" (e.g., Doc 1, Doc 2, etc.) represent document files.

Figure 6B:
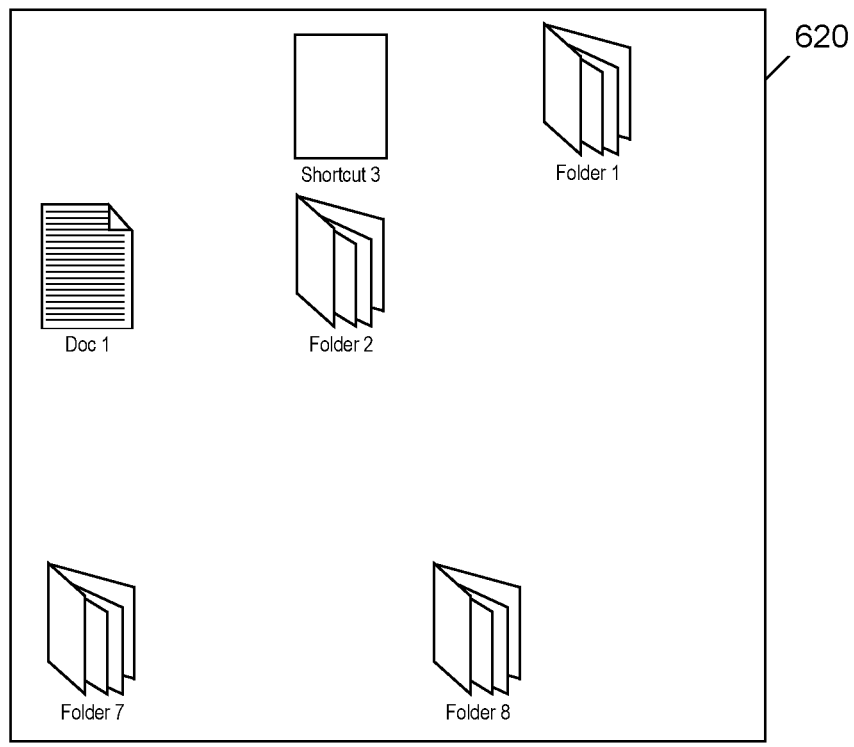

A sample view 620 in FIG. 6B is a view of desktop 114 (see FIG. 1), which is displayed after desktop decluttering system 104 (see FIG. 1) detects that a user of device 112 (see FIG. 1) opened a file or folder or accessed a shortcut in the view 600 (see FIG. 6A) to start a first current task of the user (i.e., working on Project XYZ). In step 202 (see FIG. 2), desktop decluttering system 104 (see FIG. 1) determines a subject of the first current task based on a natural language classification of the contents of the file, folder or shortcut, where the subject is Project XYZ. In step 204 (see FIG. 2), desktop decluttering system 104 (see FIG. 1) determines that Project XYZ matches a first category which includes Shortcut 3, Folder 1, Doc 1, Folder 2, Folder 7, and Folder 8 (i.e., the first subset of desktop objects) and does not match one or more categories of Shortcut 1, Shortcut 2, Shortcut 4, Folder 1, Doc 2, Shortcut 5, Folder 3, Folder 4, Folder 5, Folder 6, Doc 3, and Doc 4 (i.e., the remaining desktop objects that are not in the first subset of desktop objects).

In step 206 (see FIG. 2), desktop decluttering system 104 (see FIG. 1) identifies Shortcut 3, Folder 1, Doc 1, Folder 2, Folder 7, and Folder 8 as being related to working on Project XYZ. In step 208 (see FIG. 2), desktop decluttering system 104 (see FIG. 1) identifies Shortcut 1, Shortcut 2, Shortcut 4, Folder 1, Doc 2, Shortcut 5, Folder 3, Folder 4, Folder 5, Folder 6, Doc 3, and Doc 4 as being not related to working on Project XYZ. In step 210 (see FIG. 2), desktop decluttering system 104 (see FIG. 1) hides Shortcut 1, Shortcut 2, Shortcut 4, Folder 1, Doc 2, Shortcut 5, Folder 3, Folder 4, Folder 5, Folder 6, Doc 3, and Doc 4 from being viewed by the user on desktop 114 (see FIG. 1), thereby displaying only Shortcut 3, Folder 1, Doc 1, Folder 2, Folder 7, and Folder 8 in view 620.

Figure 6C:
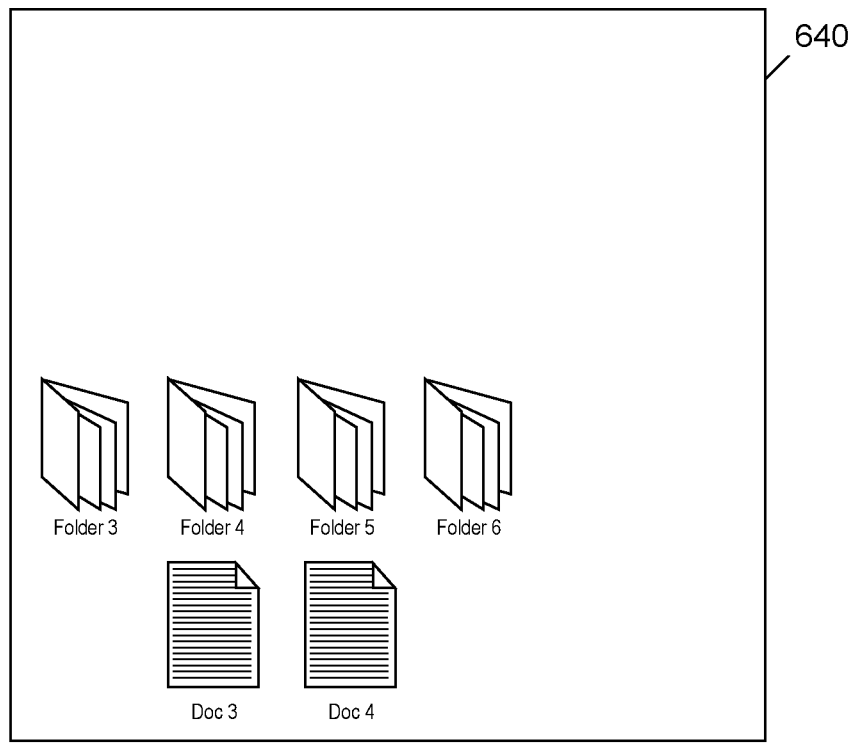

A sample view 640 in FIG. 6C is a view of desktop 114 (see FIG. 1), which is displayed after desktop decluttering system 104 (see FIG. 1) detects that the user of device 112 (see FIG. 1) opened a file or folder or accessed a shortcut in the view 600 (see FIG. 6A) to start a second current task of the user. In step 202 (see FIG. 2), desktop decluttering system 104 (see FIG. 1) uses a natural language classification technique to determine a subject of the second current task, where the subject is Patents. In step 204, (see FIG. 2), desktop decluttering system 104 (see FIG. 1) determines that Patents matches a second category that includes Folder 3, Folder 4, Folder 5, Folder 6, Doc 3, and Doc 4 (i.e., the second subset of desktop objects) and does not match one or more categories of Shortcut 1, Shortcut 2, Shortcut 3, Shortcut 4, Folder 1, Doc 1, Doc 2, Folder 2, Shortcut 5, Folder 7, and Folder 8 (i.e., the remaining desktop objects that are not in the second subset of desktop objects).

In step 206 (see FIG. 2), desktop decluttering system 104 (see FIG. 1) identifies Folder 3, Folder 4, Folder 5, Folder 6, Doc 3, and Doc 4 as being related to working on a project related to patents. In step 208 (see FIG. 2), desktop decluttering system 104 (see FIG. 1) identifies Shortcut 1, Shortcut 2, Shortcut 3, Shortcut 4, Folder 1, Doc 1, Doc 2, Folder 2, Shortcut 5, Folder 7, and Folder 8 as being not related to working on the project related to patents. In step 210 (see FIG. 2), desktop decluttering system 104 (see FIG. 1) hides Shortcut 1, Shortcut 2, Shortcut 3, Shortcut 4, Folder 1, Doc 1, Doc 2, Folder 2, Shortcut 5, Folder 7, and Folder 8 from being viewed by the user on desktop 114 (see FIG. 1), thereby displaying only Folder 3, Folder 4, Folder 5, Folder 6, Doc 3, and Doc 4 in view 640.

Figure 6D:
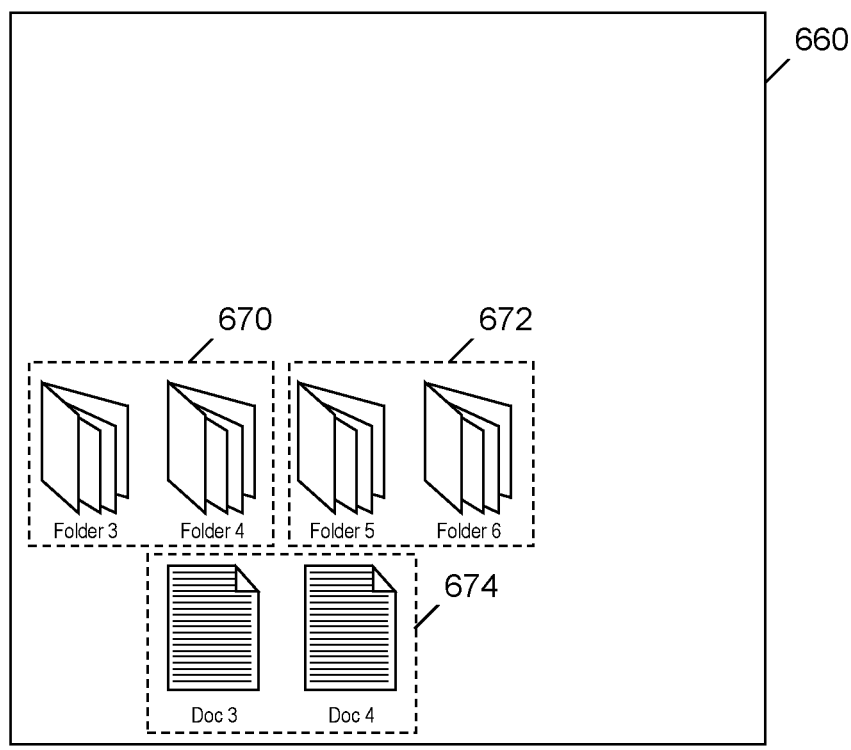
FIG. 6D depicts an example of a view of the second subset of desktop objects displayed in the view of the desktop depicted in FIG. 6C and further subdivided by sub-categories, in accordance with embodiments of the present invention.

FIG. 6D depicts an example of a view 660 of the desktop objects displayed in view 640 depicted in FIG. 6C and further subdivided by person-based sub-categories 670, 672, and 674, in accordance with embodiments of the present invention. Sub-category 670 includes desktop objects Folder 3 and Folder 4, which are associated with Person A, who is involved in one or more patents being worked on by the user. Sub-category 672 includes desktop objects Folder 5 and Folder 6, which are associated with Person B, who is involved in one or more patents being worked on by the user. Sub-category 674 includes desktop objects Doc 3 and Doc 4, which are associated with Person C, who is involved in one or more patents being worked on by the user.

For example, if step 202 (see FIG. 2) determines that the subject of the current task is a patent that involves documents authored by Person B, then alternatives to the remaining steps in FIG. 2 reference the sub-category of patents that involves documents authored by Person B. In step 204 (see FIG. 2), desktop decluttering system 104 (see FIG. 1) determines that the subject of the current task matches the Patent category and the Person B sub-category, which include Folder 5 and Folder 6, and does not match the one or more categories of the remaining desktop objects. In step 206 (see FIG. 2), desktop decluttering system 104 (see FIG. 1) identifies Folder 5 and Folder 6 as being related to the current task of working on patents that involve documents authored by Person B. In step 208 (see FIG. 2), desktop decluttering system 104 (see FIG. 1) determines that the desktop objects Shortcut 1, Shortcut 2, Shortcut 3, Shortcut 4, Folder 1, Doc 1, Doc 2, Folder 2, Shortcut 5, Folder 3, Folder 4, Folder 7, Doc 3, Doc 4, and Folder 8 are not related to the current task of working on patents that involve documents authored by Person B. In step 210 (see FIG. 2), desktop decluttering system 104 (see FIG. 1) hides Shortcut 1, Shortcut 2, Shortcut 3, Shortcut 4, Folder 1, Doc 1, Doc 2, Folder 2, Shortcut 5, Folder 3, Folder 4, Folder 7, Doc 3, Doc 4, and Folder 8 from being viewed on desktop 114 (see FIG. 1), thereby displaying only Folder 5 and Folder 6 (i.e., folders that include documents authored by Person B) on the desktop 114 (see FIG. 1).

Computer System

Figure 7:
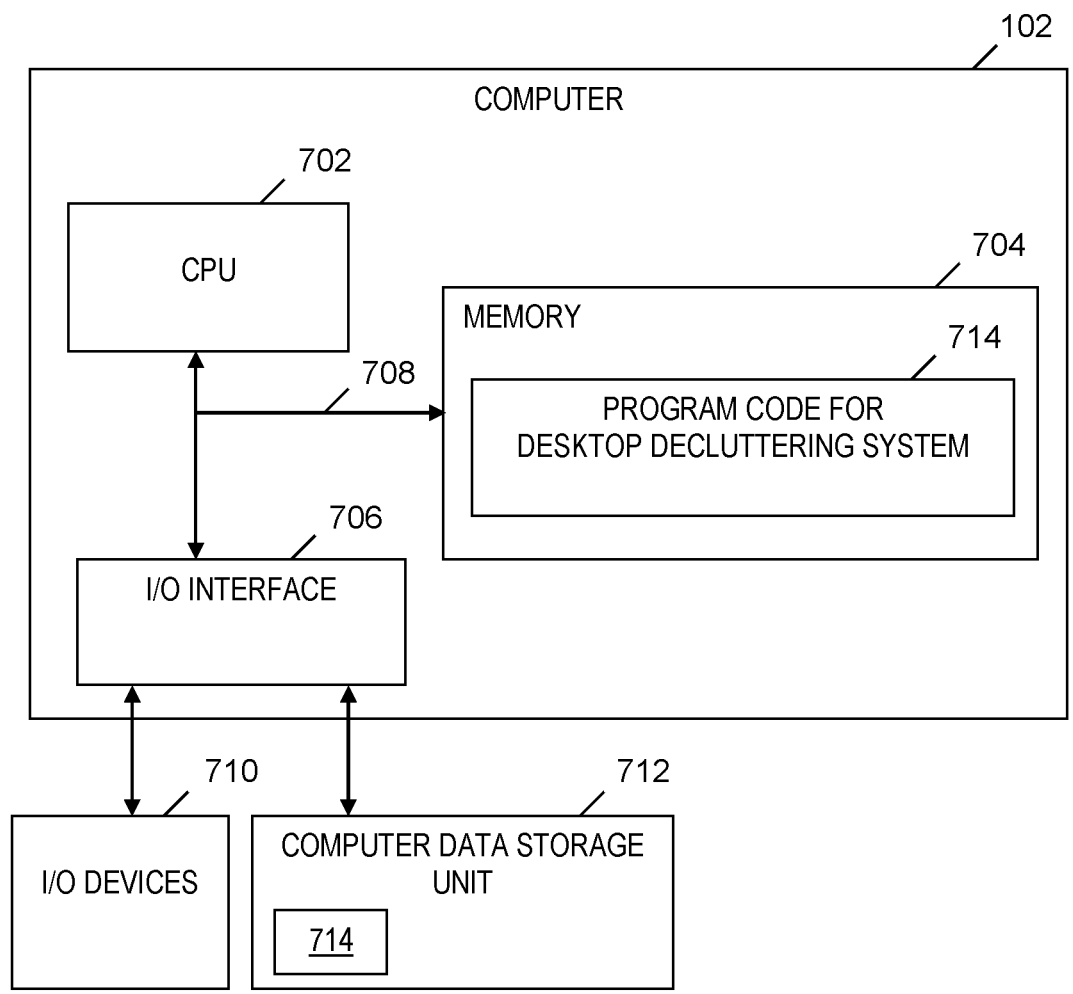
FIG. 7 is a block diagram of a computer included in the system of FIG. 1 and that implements the process of FIG. 2, in accordance with embodiments of the present invention.

FIG. 7 is a block diagram of a computer 102 included in the system of FIG. 1 and that implements the process of FIG. 2, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for desktop decluttering system 104 (see FIG. 1) to perform a method of decluttering a device desktop, where the instructions are executed by CPU 702 via memory 704. CPU 702 may include a single processing unit or be distributed across one or more processing units in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer-readable storage medium, which is described below. In one embodiment, computer data storage unit 712 is a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are executed by CPU 702 via memory 704 to declutter a device desktop. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to decluttering a device desktop. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to declutter a device desktop. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of decluttering a device desktop.

While it is understood that program code 714 for decluttering a device desktop may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of decluttering a device desktop. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, switches, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, FIG. 4, and FIG. 5) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of decluttering a desktop of a device, the method comprising the steps of:
 determining, by one or more processors and using a natural language classification technique, a subject of a current task of a user using a device;
 determining, by the one or more processors and based on meta-data of objects on a desktop of the device, that the subject of the current task matches a category of first one or more objects on the desktop and does not match one or more categories of second one or more objects on the desktop;
 based on the subject of the current task matching the category of the first one or more objects and the subject of the current task not matching the one or more categories of the second one or more objects, identifying, by the one or more processors, the first one or more objects as being related to the current task and the second one or more objects as being not related to the current task;

based on the first one or more objects being identified as being related to the current task, visually emphasizing, by the one or more processors, the first one or more objects on the desktop by emboldening graphical elements and text of the first one or more objects on the desktop; and based on the second one or more objects being identified as being not related to the current task, visually de-emphasizing, by the one or more processors, the second one or more objects on the desktop by lightening graphical elements of the second one or more objects on the desktop, so that the lightened graphical elements of the second one or more objects are less visually prominent on the desktop than the emboldened graphical elements of the first one or more objects.

2. The method of claim 1, further comprising the steps of:
receiving, by the one or more processors, a selection of a file or a folder included in the objects on the desktop;
determining, by the one or more processors, that the selected file or folder is not associated with a category by any meta-data of the selected file or folder;
based on the selected file or folder not being associated with the category, determining, by the one or more processors, that a preconfigured rule indicates that keywords or one or more people specified in the selected file or folder indicate that the selected file or folder is related to a given category; and
marking, by the one or more processors, the selected file or folder with meta-data that specifies the given category.

3. The method of claim 1, further comprising the steps of:
receiving, by the one or more processors, a selection of a file or a folder included in the objects on the desktop;
determining, by the one or more processors, that the selected file or folder is associated with an initial category by meta-data of the selected file or folder;
receiving, by the one or more processors, a manual override by a user of the meta-data associating the selected file or folder with the initial category so that the meta-data is associated with a new category;
based on the receipt of the manual override, adjusting, by the one or more processors, a rule that had specified an association between the meta-data and the initial category so that the rule specifies a new association between the meta-data and the new category;
receiving, by the one or more processors, a selection of another file or another folder included in the objects on the desktop; and
determining, by the one or more processors, that the adjusted rule indicates that keywords or one or more people specified in the selected other file or other folder indicate that the selected other file or other folder is related to the new category.

4. The method of claim 1, further comprising the steps of:
receiving, by the one or more processors, a selection of a file or a folder included in the objects on the desktop;
determining, by the one or more processors, that the selected file or folder is not associated with a category by any meta-data;
based on the selected file or folder not being associated with the category, determining, by the one or more processors, that preconfigured rules indicate that the selected file or folder is not related to any given category;

in response to the step of determining that the preconfigured rules indicate that the selected file or folder is not related to any given category, cognitively assessing, by the one or more processors, a content of the selected file or folder using the natural language classification technique, which determines a prevalence of keywords in the content and determines that the keywords are associated with a given category based on the prevalence; and marking, by the one or more processors, the selected file or folder with meta-data that specifies the given category associated with the keywords.

5. The method of claim 4, further comprising the steps of:
subsequent to the steps of cognitively assessing the content and marking the selected file or folder with the meta-data that specifies the given category associated with the keywords, updating a knowledge base to include an association between the keywords and the given category, which indicates a self-learning by the knowledge base;
subsequent to the step of updating the knowledge base, receiving, by the one or more processors, a manual override by a user of the meta-data that specifies the given category associated with the keywords so that the meta-data specifies a new category;
based on the receipt of the manual override, updating, by the one or more processors, tables in the knowledge base so that the association between the keywords and the given category is modified to become a new association between the keywords and a second category, wherein the keywords are no longer associated with the given category by the knowledge base;
receiving, by the one or more processors, a selection of another file or another folder included in the objects on the desktop;
determining, by the one or more processors, that content of the selected other file or other folder include the keywords; and
based on (i) the new association between the keywords and the second category and (ii) the content of the selected other file or other folder including the keywords, determining, by the one or more processors, that the selected other file or other folder is associated with the second category, without requiring a cognitive assessment of the content of the selected other file or other folder.

6. The method of claim 4, wherein the step of cognitively assessing includes the steps of:
determining that a word included in the content of the selected file or folder is not one of a plurality of keywords specified by preconfigured rules;
using a synonym dictionary and based on the word not being one of the plurality of keywords, looking up the word included in the content of the selected file or folder and finding a synonym of the word;
determining that the synonym of the word is one of the plurality of keywords specified by the preconfigured rules; and
based on the synonym being one of the plurality of keywords, determining that the word is associated with the given category.

7. The method of claim 1, further comprising the step of:
providing at least one support service for at least one of creating, integrating, hosting, maintaining, and deploying computer readable program code in the computer, the program code being executed by a processor of the computer to implement the steps of determining the subject of the current task, determining that the subject of the current task matches the category of the first one or more objects on the desktop and does not match one or more categories of the second one or more objects on the desktop, identifying the first one or more objects as being related to the current task and the second one or more objects as being not related to the current task, visually emphasizing the first one or more objects, and visually de-emphasizing the second one or more objects.

8. A computer program product for decluttering a desktop of a device, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:

using a natural language classification technique, the computer system determining a subject of a current task of a user using a device;

based on meta-data of objects on a desktop of the device, the computer system determining that the subject of the current task matches a category of first one or more objects on the desktop and does not match one or more categories of second one or more objects on the desktop;

based on the subject of the current task matching the category of the first one or more objects and the subject of the current task not matching the one or more categories of the second one or more objects, the computer system identifying the first one or more objects as being related to the current task and the second one or more objects as being not related to the current task;

based on the first one or more objects being identified as being related to the current task, the computer system visually emphasizing the first one or more objects on the desktop by emboldening graphical elements and text of the first one or more objects on the desktop; and based on the second one or more objects being identified as being not related to the current task, the computer system visually de-emphasizing the second one or more objects on the desktop by lightening graphical elements of the second one or more objects on the desktop, so that the lightened graphical elements of the second one or more objects are less visually prominent on the desktop than the emboldened graphical elements of the first one or more objects.

9. The computer program product of claim 8, wherein the method further comprises the steps of:

the computer system receiving a selection of a file or a folder included in the objects on the desktop;

the computer system determining that the selected file or folder is not associated with a category by any meta-data of the selected file or folder;

based on the selected file or folder not being associated with the category, the computer system determining that a preconfigured rule indicates that keywords or one or more people specified in the selected file or folder indicate that the selected file or folder is related to a given category; and the computer system marking the selected file or folder with meta-data that specifies the given category.

10. The computer program product of claim 8, wherein the method further comprises the steps of:

the computer system receiving a selection of a file or a folder included in the objects on the desktop;

the computer system determining that the selected file or folder is associated with an initial category by meta-data of the selected file or folder;

the computer system receiving a manual override by a user of the meta-data associating the selected file or folder with the initial category so that the meta-data is associated with a new category;

based on the receipt of the manual override, the computer system adjusting a rule that had specified an association between the meta-data and the initial category so that the rule specifies a new association between the meta-data and the new category;

the computer system receiving a selection of another file or another folder included in the objects on the desktop; and the computer system determining that the adjusted rule indicates that keywords or one or more people specified in the selected other file or other folder indicate that the selected other file or other folder is related to the new category.

11. The computer program product of claim 8, wherein the method further comprises the steps of:

the computer system receiving a selection of a file or a folder included in the objects on the desktop;

the computer system determining that the selected file or folder is not associated with a category by any meta-data;

based on the selected file or folder not being associated with the category, the computer system determining that preconfigured rules indicate that the selected file or folder is not related to any given category;

in response to the step of determining that the preconfigured rules indicate that the selected file or folder is not related to any given category, the computer system cognitively assessing a content of the selected file or folder using the natural language classification technique, which determines a prevalence of keywords in the content and determines that the keywords are associated with a given category based on the prevalence; and the computer system marking the selected file or folder with meta-data that specifies the given category associated with the keywords.

12. The computer program product of claim 11, wherein the method further comprises the steps of:

subsequent to the steps of cognitively assessing the content and marking the selected file or folder with the meta-data that specifies the given category associated with the keywords, the computer system updating a knowledge base to include an association between the keywords and the given category, which indicates a self-learning by the knowledge base;

subsequent to the step of updating the knowledge base, the computer system receiving a manual override by a user of the meta-data that specifies the given category associated with the keywords so that the meta-data specifies a new category;

based on the receipt of the manual override, the computer system updating tables in the knowledge base so that the association between the keywords and the given category is modified to become a new association between the keywords and a second category, wherein the keywords are no longer associated with the given category by the knowledge base;

the computer system receiving a selection of another file or another folder included in the objects on the desktop;

the computer system determining that content of the selected other file or other folder include the keywords; and based on (i) the new association between the keywords and the second category and (ii) the content of the selected other file or other folder including the keywords, the computer system determining that the selected other file or other folder is associated with the second category, without requiring a cognitive assessment of the content of the selected other file or other folder.

13. The computer program product of claim 11, wherein the step of cognitively assessing includes the steps of:

determining that a word included in the content of the selected file or folder is not one of a plurality of keywords specified by preconfigured rules;

using a synonym dictionary and based on the word not being one of the plurality of keywords, looking up the word included in the content of the selected file or folder and finding a synonym of the word;

determining that the synonym of the word is one of the plurality of keywords specified by the preconfigured rules; and based on the synonym being one of the plurality of keywords, determining that the word is associated with the given category.

14. A computer system comprising:

a central processing unit (CPU);

a memory coupled to the CPU;

a computer readable storage medium coupled to the CPU, the computer readable storage medium containing instructions that are executed by the CPU via the memory to implement a method of decluttering a desktop of a device, the method comprising the steps of using a natural language classification technique, the computer system determining a subject of a current task of a user using a device;

based on meta-data of objects on a desktop of the device, the computer system determining that the subject of the current task matches a category of first one or more objects on the desktop and does not match one or more categories of second one or more objects on the desktop;

based on the subject of the current task matching the category of the first one or more objects and the subject of the current task not matching the one or more categories of the second one or more objects, the computer system identifying the first one or more objects as being related to the current task and the second one or more objects as being not related to the current task;

based on the first one or more objects being identified as being related to the current task, the computer system visually emphasizing the first one or more objects on the desktop by emboldening graphical elements and text of the first one or more objects on the desktop; and based on the second one or more objects being identified as being not related to the current task, the computer system visually de-emphasizing the second one or more objects on the desktop by lightening graphical elements of the second one or more objects on the desktop, so that the lightened graphical elements of the second one or more objects are less visually prominent on the desktop than the emboldened graphical elements of the first one or more objects.

15. The computer system of claim 14, wherein the method further comprises the steps of:

the computer system receiving a selection of a file or a folder included in the objects on the desktop;

the computer system determining that the selected file or folder is not associated with a category by any meta-data of the selected file or folder;

based on the selected file or folder not being associated with the category, the computer system determining that a preconfigured rule indicates that keywords or one or more people specified in the selected file or folder indicate that the selected file or folder is related to a given category; and the computer system marking the selected file or folder with meta-data that specifies the given category.

16. The computer system of claim 14, wherein the method further comprises the steps of:

the computer system receiving a selection of a file or a folder included in the objects on the desktop;

the computer system determining that the selected file or folder is associated with an initial category by meta-data of the selected file or folder;

the computer system receiving a manual override by a user of the meta-data associating the selected file or folder with the initial category so that the meta-data is associated with a new category;

based on the receipt of the manual override, the computer system adjusting a rule that had specified an association between the meta-data and the initial category so that the rule specifies a new association between the meta-data and the new category;

the computer system receiving a selection of another file or another folder included in the objects on the desktop; and the computer system determining that the adjusted rule indicates that keywords or one or more people specified in the selected other file or other folder indicate that the selected other file or other folder is related to the new category.

17. The computer system of claim 14, wherein the method further comprises the steps of:

the computer system receiving a selection of a file or a folder included in the objects on the desktop;

the computer system determining that the selected file or folder is not associated with a category by any meta-data;

based on the selected file or folder not being associated with the category, the computer system determining that preconfigured rules indicate that the selected file or folder is not related to any given category;

in response to the step of determining that the preconfigured rules indicate that the selected file or folder is not related to any given category, the computer system cognitively assessing a content of the selected file or folder using the natural language classification technique, which determines a prevalence of keywords in the content and determines that the keywords are associated with a given category based on the prevalence; and the computer system marking the selected file or folder with meta-data that specifies the given category associated with the keywords.

18. The computer system of claim 17, wherein the method further comprises the steps of:

subsequent to the steps of cognitively assessing the content and marking the selected file or folder with the meta-data that specifies the given category associated with the keywords, the computer system updating a knowledge base to include an association between the keywords and the given category, which indicates a self-learning by the knowledge base;

subsequent to the step of updating the knowledge base, the computer system receiving a manual override by a user of the meta-data that specifies the given category associated with the keywords so that the meta-data specifies a new category;

based on the receipt of the manual override, the computer system updating tables in the knowledge base so that the association between the keywords and the given category is modified to become a new association between the keywords and a second category, wherein the keywords are no longer associated with the given category by the knowledge base;

the computer system receiving a selection of another file or another folder included in the objects on the desktop;

the computer system determining that content of the selected other file or other folder include the keywords; and based on (i) the new association between the keywords and the second category and (ii) the content of the selected other file or other folder including the keywords, the computer system determining that the selected other file or other folder is associated with the second category, without requiring a cognitive assessment of the content of the selected other file or other folder.

19. The computer system of claim 17, wherein the step of cognitively assessing includes the steps of:

determining that a word included in the content of the selected file or folder is not one of a plurality of keywords specified by preconfigured rules;

using a synonym dictionary and based on the word not being one of the plurality of keywords, looking up the word included in the content of the selected file or folder and finding a synonym of the word;

determining that the synonym of the word is one of the plurality of keywords specified by the preconfigured rules; and based on the synonym being one of the plurality of keywords, determining that the word is associated with the given category.

* * * * *